United States Patent
Bae et al.

(10) Patent No.: US 7,604,790 B2
(45) Date of Patent: Oct. 20, 2009

(54) METHOD OF REMOVING CARBONACEOUS IMPURITIES IN CARBON NANOTUBES

(75) Inventors: Eun-Ju Bae, Yongin-si (KR); Yo-Sep Min, Yongin-si (KR); Wan-Jun Park, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 540 days.

(21) Appl. No.: 11/370,995

(22) Filed: Mar. 9, 2006

(65) Prior Publication Data

US 2009/0226360 A1    Sep. 10, 2009

(51) Int. Cl.
*C01B 31/00*    (2006.01)
*D01F 9/12*    (2006.01)

(52) U.S. Cl. ............. 423/461; 423/447.1; 423/447.2; 423/447.3; 423/455 B; 977/840; 977/842; 977/845

(58) Field of Classification Search ............. 423/447, 423/461, 445 B, 447.1, 447.2, 447.3; 977/840, 977/842, 845
See application file for complete search history.

(56) References Cited

U.S. PATENT DOCUMENTS

| | | | | |
|---|---|---|---|---|
| 4,011,303 | A | * | 3/1977 | MacGregor ............ 423/461 |
| 5,641,466 | A | * | 6/1997 | Ebbesen et al. ......... 423/447.2 |
| 6,517,800 | B1 | * | 2/2003 | Cheng et al. ............. 423/447.1 |
| 6,923,915 | B2 | * | 8/2005 | Alford et al. ............. 210/634 |
| 2005/0036937 | A1 | * | 2/2005 | Brorson et al. ........... 423/561.1 |
| 2007/0258881 | A1 | * | 11/2007 | Kambara et al. ......... 423/447.2 |

FOREIGN PATENT DOCUMENTS

| | | | |
|---|---|---|---|
| KR | 2003-046858 | | 6/2003 |
| KR | 2004-059326 | | 2/2004 |
| WO | WO02064868 | * | 8/2002 |
| WO | WO02064869 | * | 8/2002 |

OTHER PUBLICATIONS

Jeong et al (Chemical physics letters, 2001, 344:18-22).*
Nash, Icarus, 1987, 72:1-34, abstract.*
Tans et al (Nature, 1998, 393: 49-52).*
Lide (CRC handbook of Chemistry and Physics, 2008, 88th edition, p. 5-20).*

* cited by examiner

*Primary Examiner*—Melvin C Mayes
*Assistant Examiner*—Jun Li
(74) *Attorney, Agent, or Firm*—Harness, Dickey & Pierce, P.L.C.

(57) ABSTRACT

A method of selectively removing carbonaceous impurities from carbon nanotubes (CNTs). In an example method, impurities formed on the surface of the CNTs may be removed by a sulfidation reaction between the impurities and sulfur in a sealed space. More specifically, a method of selectively removing only amorphous carbon by which carbon nanotube walls do not react with sulfur and only carbonaceous impurities formed on the surface of the CNTs make sulfidation reaction ($C+2S \rightarrow CS_2$), that is, a method of selectively removing carbonaceous impurities from the CNTs integrated in a device by sulfidation is provided.

11 Claims, 6 Drawing Sheets

METHOD OF REMOVING CARBONACEOUS IMPURITIES IN CARBON NANOTUBES

PRIORITY STATEMENT

This application claims the benefit of Korean Patent Application No. 10-2005-0056228, filed on Jun. 28, 2005, in the Korean Intellectual Property Office, the disclosure of which incorporated herein in its entirety by reference.

BACKGROUND OF THE INVENTION

1. Field of the Invention

Example embodiments of the present invention relate to methods of removing carbonaceous impurities formed on the surface of carbon nanotubes (CNTs)

2. Description of the Related Art

Carbon nanotubes (CNTs) have been investigated due to their unique one-dimensional structure with adjustable electronic conductivity and mechanical strength. To obtain intrinsic properties of CNTs, the CNTs should be relatively pure, for example, with low quantities of or without carbonaceous impurities, for example, amorphous carbons, on their surface.

Conventional methods of preparing CNTs may include an arc-discharge process, a laser ablation process, a chemical vapor deposition (CVD) process, or a high pressure carbon monoxide process. However, regardless of the method of preparing CNTs, carbonaceous materials on their surface are the most common impurities formed during growth. Because carbon particles are more susceptible to oxidation than perfect nanotube walls, CNTs have been purified by oxidative treatments in a gas phase or liquid phase.

Conventionally, CNTs for device applications are directly grown on a pre-patterned catalyst by CVD due to its compatibility with conventional CMOS processes and deposition on large areas. However, oxidative treatments are not suitable for the purification of CNTs integrated in a device because CNTs may be lost or deformed during the oxidation process due to high reactivity or properties, for example, electrical properties may be changed. Therefore, CNTs grown by CVD are generally used without a subsequent purification process in order to avoid damages from the oxidative treatments.

Recently, CNTs have been prepared without surface carbonaceous impurities by using water vapor or ammonia gas, or by using a rapid growth process. However, the occurrence of carbonaceous impurities is inevitable during CVD.

SUMMARY OF THE INVENTION

Example embodiments of the present invention are directed to the removal of carbonaceous impurities from CNTs and from CNTs integrated in a device.

Example embodiments of the present invention provide a method of removing carbonaceous impurities formed on the surface of carbon nanotubes (CNTs) by reacting the CNTs with sulfur.

Example embodiments of the present invention also provide a method of removing carbonaceous impurities formed on the surface of CNTs of a device by reacting the CNTs with sulfur.

According to an example embodiment of the present invention, there is provided a method of removing carbonaceous impurities in a carbon nanotube, the method including preparing sulfur and carbon nanotubes in a sealed space and sulfiding a surface of the carbon nanotubes to remove impurities formed on the carbon nanotubes.

According to another example embodiment of the present invention, there is provided a method of removing carbonaceous impurities in carbon nanotube, the method including preparing sulfur and a device in which carbon nanotubes are integrated, in a sealed space and sulfiding a surface of the carbon nanotubes to remove impurities formed on the carbon nanotubes.

In an example embodiment, removing the impurities may include heating the sulfur and the impurities above a temperature to induce the sulfidation between the sulfur and the impurities.

In an example embodiment, the temperature of the sulfidation may be 150° C. or more.

In an example embodiment, the sulfur prepared in the sealed space may be in a solid state.

In an example embodiment, heating the sealed space may include maintaining the sealed space at about 300° C. for a desired amount of time, for example, at about 300° C. for more than 30 minutes.

In an example embodiment, removing the impurities may further include forming a vacuum state in the sealed space by discharging gas in the sealed space before the heating of the sealed space.

In an example embodiment, removing the impurities may further include removing carbon disulfide ($CS_2$) resulting from sulfidation reaction of sulphuric evaporated gas and the impurities formed on the surface of the carbon nanotubes.

BRIEF DESCRIPTION OF THE DRAWINGS

The above and other aspects of the present invention will become more apparent by describing in detail example embodiments thereof with reference to the attached drawings in which.

DETAILED DESCRIPTION OF EXAMPLE EMBODIMENTS OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout the figures. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can, encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes", "comprises", "including" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of example embodiments (and intermediate structures) of the present invention. As such, variations from the shapes of the illustrations as a result, of manufacturing techniques and/or tolerances, for example, are to be expected. Thus, example embodiments of the present invention should not be construed as limited to the particular shapes of regions illustrated herein and are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation, for example, may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail by explaining example embodiments of the invention with reference to the attached drawings. In the drawings, the thicknesses of layers and regions are exaggerated for clarity.

Figure 1:
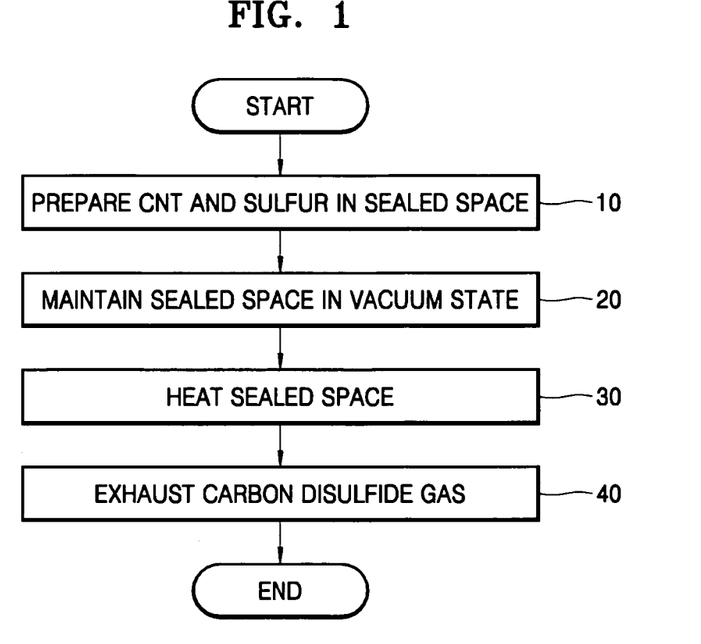
FIG. 1 is a flowchart illustrating a method of removing carbonaceous impurities formed on the surface of carbon nanotubes (CNTs) according to an example embodiment of the present invention.
Figure 2:
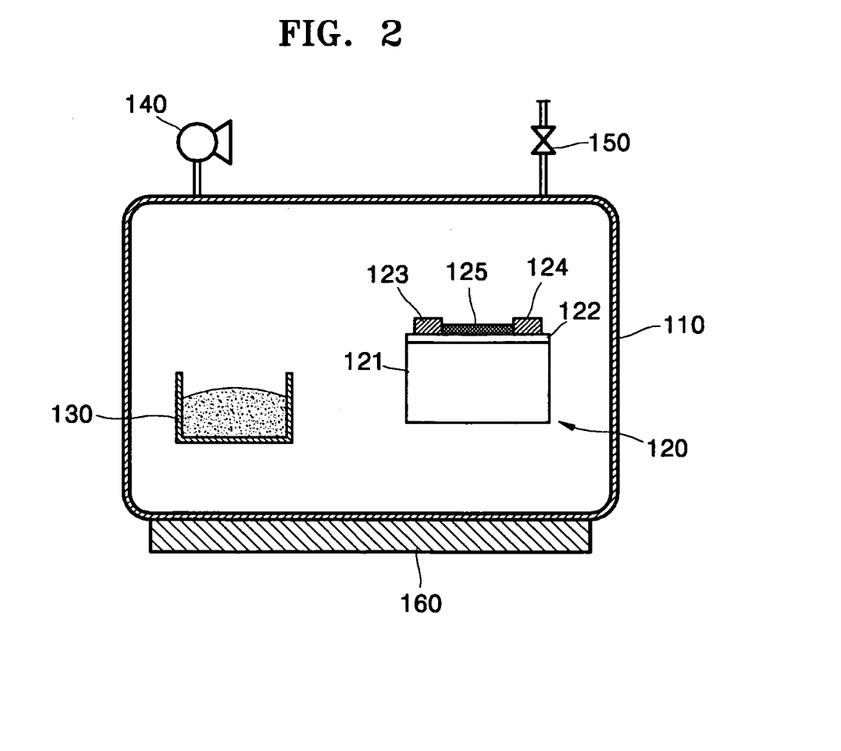
FIG. 2 is a schematic diagram showing an apparatus used for the method of removing carbonaceous impurities formed on the surface of CNTs according to an example embodiment of the present invention.

FIG. 1 is a flowchart illustrating a method of removing carbonaceous impurities formed on the surface of carbon nanotubes (CNTs) according to an example embodiment of the present invention, and FIG. 2 is a schematic diagram showing an apparatus used for the method of removing carbonaceous impurities formed on the surface of CNTs according to an example embodiment of the present invention.

Referring to FIG. 2, a carbon nanotube-field effect transistor (CNT-FET) 120 and an aluminium container 130 in which sulfur is held may be disposed in a sealed container 110. A vacuum pump 140 and a discharge valve 150 may be connected to the sealed container 110, and a heater 160 may be attached to one side of the sealed container 110.

The CNT-FET 120 may include a conductive substrate 121, for example, a highly-doped silicon wafer, a gate oxide layer 122 formed on the substrate 121, a drain electrode 123 and a source electrode 124 spaced apart from each other on the gate oxide layer 122, and a CNT 125 which is located between the drain electrode 123 and the source electrode 124. The CNT 125 may act as a channel region. The conductive substrate 121 may act as a gate electrode.

The vacuum pump 140 may be used to create a vacuum inside the sealed container 110, and the discharge valve 150 may be used to discharge carbon disulfide ($CS_2$) in the sealed container 110. In an example embodiment of the present invention, sulfidation may be used to selectively remove carbonaceous impurities from CNTs, because sulfidation is less reactive to carbon than oxidation, considering that molar Gibbs free energies of formation of gaseous $CO_2$ and $CS_2$ are −394.4 and 67.1 kJ/mol at room temperature, respectively, and further, sulfur shows higher volatility and colorless carbon disulfide ($CS_2$) which is a product can be easily removed.

Referring to FIG. 1, in operation 10, an aluminium container in which sulfur is held and a CNT or CNT-FET may be prepared in a sealed container. In case of a device including CNT, a CNT device having an exposed surface of CNT may be prepared. In operation 20, an inside of the sealed container may be maintained in a vacuum state less than 0.01 Torr by operating the vacuum pump 140.

In operation, the sealed container may be heated using a heater. The temperature of the sealed container 110 may be heated to 300° C. and maintained for 30 minutes. Sulfur (S) in a solid state may be dissolved at about 120° C. and evaporated at about 250° C. Amorphous carbon formed on the surface of CNT starts to react with sulfur at about 150° C. The sulfication of carbonaceous impurities may be performed at 300° C. to enhance the reactivity difference between carbonaceous impurities and CNTs. In this manner, sulfur (S) in a solid state may be provided with CNTs in a sealed space then the sealed space in which sulfur (S) in a solid state is included is gradually heated to induce a sulfidation reaction. Alternatively, the sealed space may be gradually heated and simultaneously, sulphuric evaporated gas may be provided from outside the sealed space so that sulfidation reaction can be induced.

In operation 40, the discharge valve 150 may be opened, and carbon disulfide ($CS_2$) gas in the sealed space may be exhausted.

Figure 3:
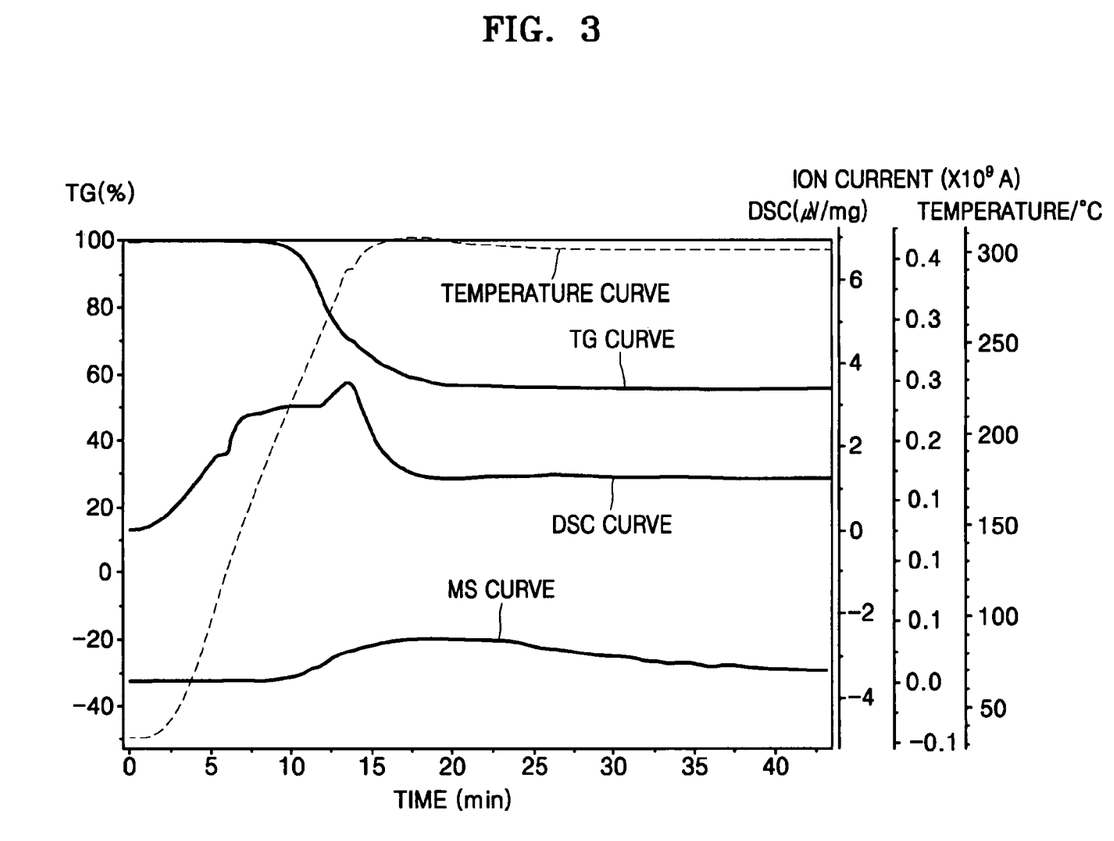
FIG. 3 is a thermogravimetry-differential scanning calorimetry-mass spectrometry (TG-DSC-MS) graph showing a sulfidation reaction of the method of removing carbonaceous impurities formed on the surface of CNTs according to an example embodiment of the present invention.

FIG. 3 is a thermogravimetry-differential scanning calorimetry-mass spectrometry (TG-DSC-MS) graph showing a sulfidation reaction of the method of removing carbonaceous impurities formed on the surface of CNTs according to an example embodiment of the present invention.

Referring to FIG. 3, single-walled carbon nanotubes prepared using electrical discharge and having purity of 60% and diameter of 1.2 to 1.4 nm and sulfur having a purity of 99.998% were put in an aluminium (Al) crucible and heated to 300° C. with a heating rate of 20° C./min, as shown in a temperature profile indicated by a dotted line of FIG. 3. The temperature was maintained at 300° C. for 30 minutes in vacuum (~0.01 Torr). In an example embodiment, a vacuum state is not needed, but other elements except for CNTs and sulfur (S) should not exist in the sealed container, and impurities should not be input or output.

A weight loss as a result of temperature can be confirmed using a thermogravimetry (TG) curve and thus, whether a sulfidation reaction has been performed or not can be confirmed. Whether the reaction is an exothermic reaction or endothermic reaction may also be confirmed using differential scanning calorimetry (DSC). A material generated by reaction can be confirmed using a mass spectrometry (MS) curve. In FIG. 3, TG, DSC, and MS were simultaneously measured.

In the DSC curve of FIG. 3, two endothermic peaks due to the melting and evaporation of sulfur are observed at 120° C. and 250° C., respectively, and an exothermic peak from the sulfidation of carbonaceous impurities appears at 290° C. In the MS curve of FIG. 3, the mass density of carbon disulfide ($CS_2$) (76 amu) increases from 150° C. to 290° C. of the exothermic peak and subsequently reaches its maximum at 306° C. It then decreases due to the exhaustion of sulfur. This reveals that sulfur reacts with carbonaceous impurities on the surface of CNTs by the sulfidation reaction, $C+2S \rightarrow CS_2$, at 300° C. in vacuum (~0.01 Torr).

Figure 4:
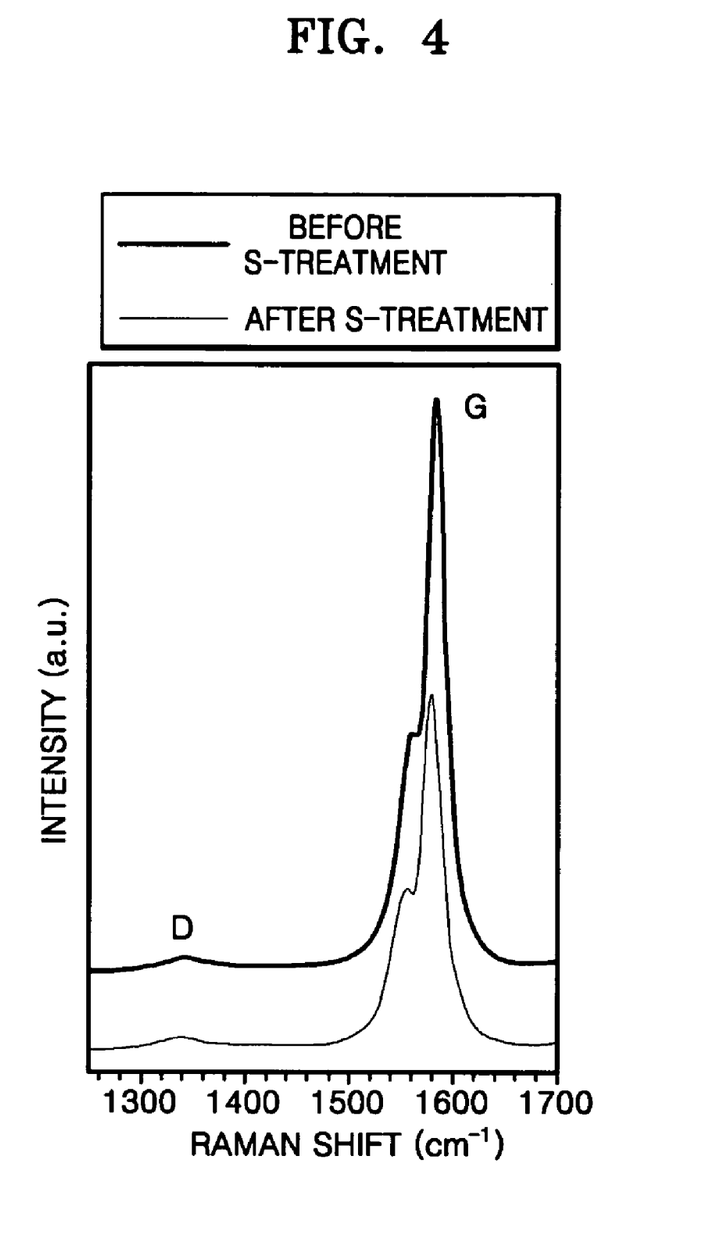
FIG. 4 is a Raman spectrum graph comparing spectra before and after a sulfidation reaction according to an example embodiment of the present invention.

FIG. 4 is a Raman spectrum graph comparing spectra before and after sulfur reaction according to an example embodiment of the present invention. Selective reaction of carbonaceous impurities and sulfur may be known by comparing the spectra before and after sulfur treatment using Raman spectroscopy (514 nm laser).

The spectra were obtained at ten positions and averaged. The overall tendency of the Raman spectra of the sulfur before and after sulfur treatment is nearly same. However, the ratio of a D-band to a tangential G-band (ID/IG) due to disorder decreases from 0.05 to 0.035 after sulfur treatment. This means that the nanotube walls are not sulfidized and not deformed, but only amorphous carbonaceous impurities are selectively removed by the sulfur treatment.

Figure 5:
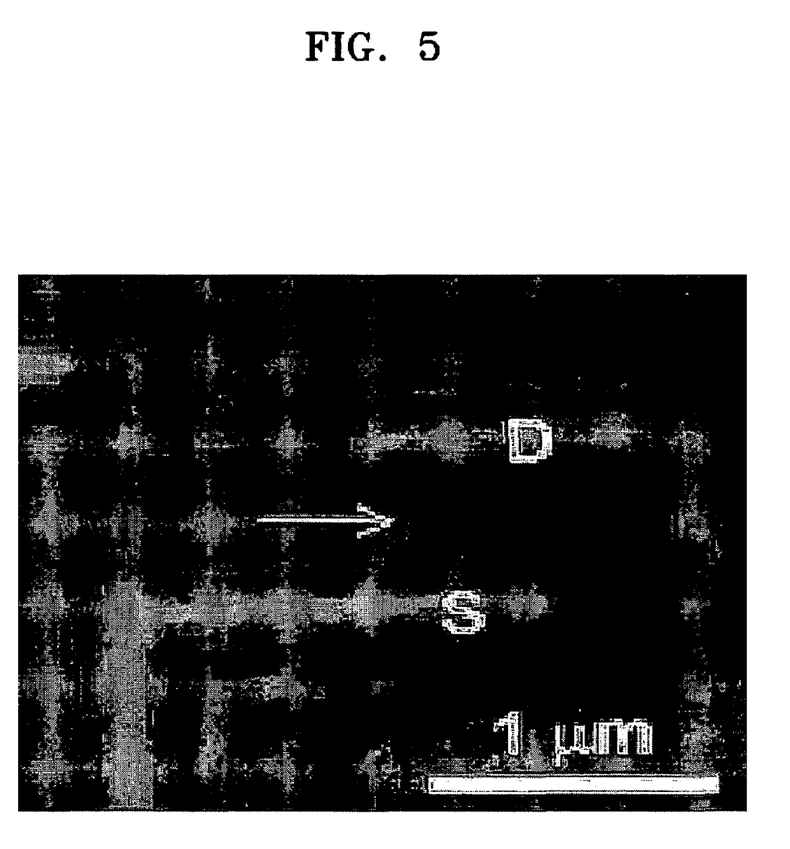
FIG. 5 is an atomic force microscopic (AFM) photo of carbon nanotube-field effect transistor (CNT-FET) used in an example embodiment of the present invention.

FIG. 5 is an atomic force microscopic (AFM) photo of carbon nanotube-field effect transistor (CNT-FET) used in an example embodiment of the present invention. In FIG. 5, S and D denote a source electrode and a drain electrode, respectively, and CNT is indicated by an arrow.

Because carbon nanotube walls are insensitive to sulfidation, the purification method by sulfidation may be applied to CNTs integrated in devices. To prove this, electrical properties of CNTs integrated in a FET before and after sulfur treatment were compared. A procedure of fabricating a CNT-FET is as follows. CNTs were dispersed in a solvent and spin-coated on $SiO_2$ grown on a highly doped p-Si substrate. The CNTs were located on the p-Si substrate using a scanning microscope. After patterns for metal contacts were generated using electron-beam lithography, Pd electrodes of 100 nm were defined by a lift-off process.

Figure 6:
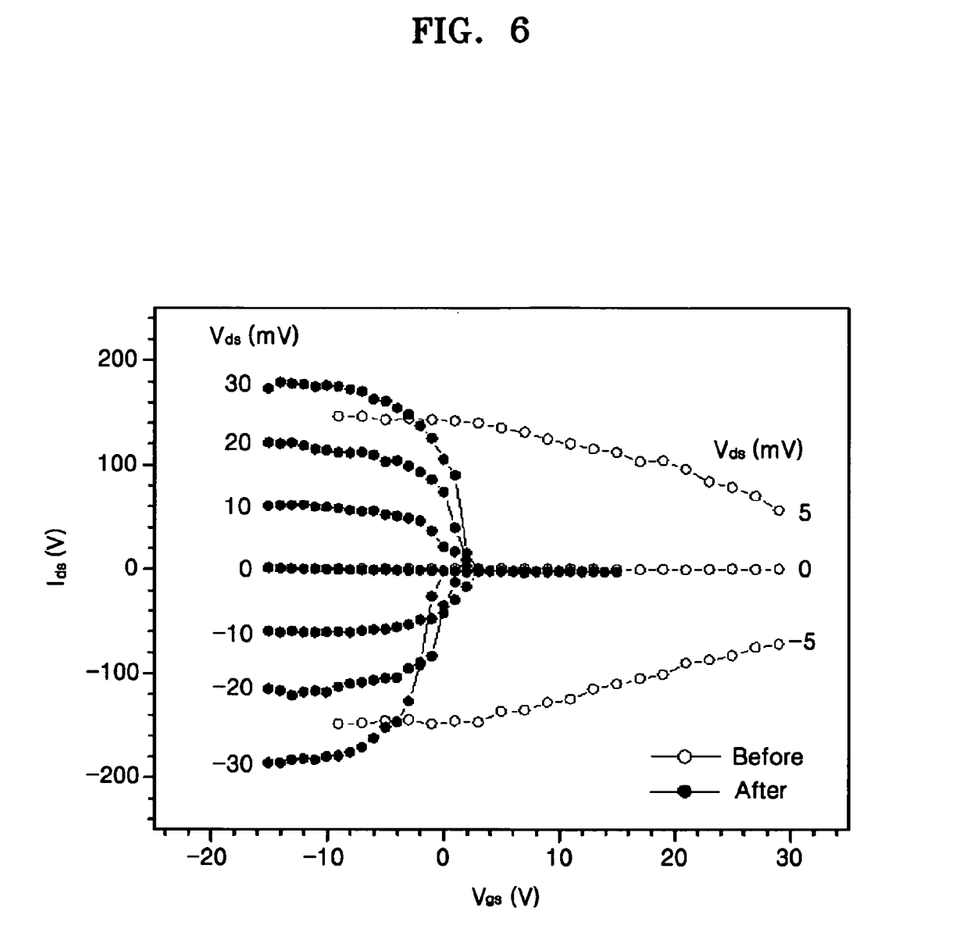
FIG. 6 is a graph showing Ids-Vgs characteristics comparing Ids-Vgs characteristics of CNT-FETs having poorer switching characteristics and Ids-Vgs characteristics of CNT-FETs after sulfur treatment according to an example embodiment the present invention.

FIG. 6 is a graph showing Ids-Vgs characteristics comparing Ids-Vgs characteristics of CNT-FETs having poorer switching characteristics and Ids-Vgs characteristics of CNT-FETs after sulfur treatment according to an example embodiment of the present invention. In FIG. 6, a curve of data indicated by open circles shows drain-source current Ids versus gate-source voltage Vgs of CNT-FETs having poor switching characteristics. The transistor having a resistance of $40 k\Omega$ does not clearly show a threshold voltage Vth, which indicates a transition voltage from an off-state to an on-state. There are two factors for the transistor to show such poor switching characteristics. First, since the CNT integrated in the transistor is a conductor or semiconductor having a narrow band gap, a high off-state current can appear. Second, carbonaceous impurities on the outer surface of the CNT may act as a conduction path between a source and a drain, consequently increasing the off-state current in the transistor.

Sulfur treatment for the CNT integrated in the FET was as follows.

A CNT-FET specimen was placed in a vacuum chamber with a base pressure of 11.7 mTorr, together with sulfur contained in an Al crucible. The specimen was heated at 300° C. for 30 minutes without any carrier gas. During the sulfur treatment, working pressure gradually decreased from 15.3 mTorr to the base pressure as sulfur was evaporated and exhausted. After cooling down, the specimen was removed from the vacuum chamber.

In FIG. 6, a curve of data indicated by solid circles shows Ids-Vgs characteristics of CNT-FETs after sulfur treatment. This is different from a device before sulfur treatment in that the sulfur-treated CNT-FET shows clear on/off switching characteristics with a threshold voltage Vth of 3V.

Figure 7:
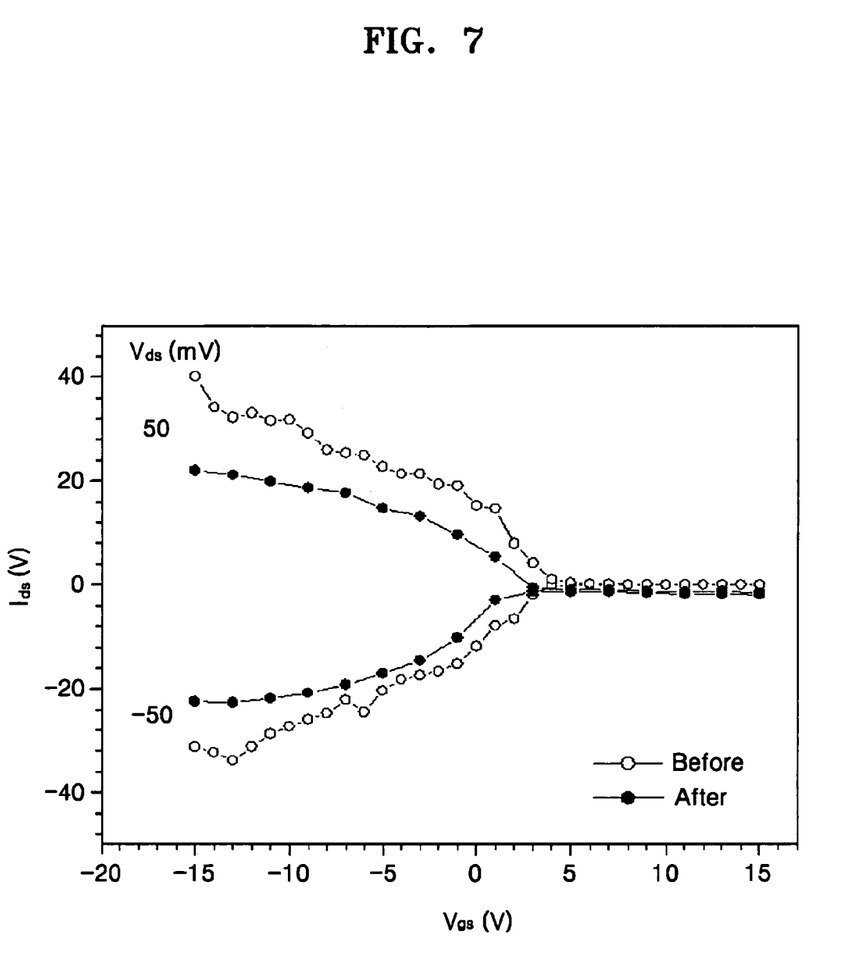
FIG. 7 is a graph showing Ids-Vgs characteristics comparing Ids-Vgs characteristics of normal CNT-FETs and Ids-Vgs characteristics of CNT-FETs after sulfur treatment according to an example embodiment the present invention.

FIG. 7 is a graph showing Ids-Vgs characteristics comparing Ids-Vgs characteristics of normal CNT-FETs and Ids-Vgs characteristics of CNT-FETs after sulfur treatment according to an example embodiment of the present invention. To confirm a property change after sulfur treatment, another experiment was conducted on another CNT-FET which had normally operated as a transistor before sulfur treatment. This is shown as a curve of data indicated by open circles of FIG. 7 and the FET shows a typical p-PET Ids-Vgs curve with a threshold voltage Vth of about 3V. The curve after sulfur treatment is shown as a curve of data indicated by solid circles, and the FET still operates a p-FET having the same threshold voltage. If sulfur reaction has occurred on nanotube walls by sulfur treatment, due to a band gap widened by deformation of the nanotube walls, a threshold voltage may be shifted. However, as expected from the Raman spectra, there is no shift in Vth with sulfur treatment. This reveals that the high off-state current is caused by the carbonaceous impurities on the surface of the nanotube, which shows that the carbonaceous impurities were selectively removed by sulfur treatment.

The purification of CNTs by sulfidation may be used to remove carbonaceous impurities that may remain after initial purifying procedures by other methods, and be more useful for nanotubes integrated in devices for fundamental characterizations or industrial applications.

As described above, in a method of removing carbonaceous impurities formed on the surface of carbon nanotubes (CNTs) by sulfidation according to an example embodiment of the present invention, only carbonaceous impurities formed on the surface of CNTs may be removed without any damage or deformation of CNTs. In addition, only amorphous carbonaceous impurities formed on the surface of CNTs integrated in devices may be selectively removed and purified while being integrated in devices such that electrical characteristics of the devices may be improved. Furthermore, mass production of high-purity CNTs may be performed.

While the present invention has been particularly shown and described with reference to example embodiments thereof, it will be understood by those skilled in the art that various changes in form and details may be made therein without departing from the spirit and scope of the invention as defined by the following claims.

What is claimed is:

1. A method of removing carbonaceous impurities in a carbon nanotube, the method comprising:
    preparing sulfur and carbon nanotubes in a sealed space, the sulfur being in a solid state; and
    sulfiding a surface of the carbon nanotubes to remove carbonaceous impurities formed on the carbon nanotubes,
    wherein the sulfiding includes heating the sulfur and the carbonaceous impurities above a temperature to induce a sulfidation reaction between the sulfur and the carbonaceous impurities and removing carbon disulfide ($CS_2$) resulting from the sulfidation reaction of sulphuric evaporated gas and the carbonaceous impurities formed on the surface of the carbon nanotubes.

2. The method of claim 1, wherein the temperature of the sulfidation reaction is 150° C. or more.

3. The method of claim 1, wherein heating the sealed space includes maintaining the sealed space at about 300° C.

4. The method of claim 3, wherein heating the sealed space includes maintaining the sealed space at about 300° C. for more than 30 minutes.

5. The method of claim 3, wherein the sulfiding further includes forming a vacuum state in the sealed space by discharging gas in the sealed space before heating the sealed space.

6. A method of removing carbonaceous impurities in carbon nanotube, the method comprising:
    preparing sulfur and a device in which carbon nanotubes are integrated, in a sealed space, the sulfur being in a solid state; and
    sulfiding a surface of the carbon nanotubes to remove carbonaceous impurities formed on the carbon nanotubes,
    wherein the sulfiding includes heating the sulfur and the carbonaceous impurities above a temperature to induce a sulfidation reaction between the sulfur and the carbonaceous impurities and removing carbon disulfide ($CS_2$) resulting from the sulfidation reaction of sulphuric evaporated gas and the carbonaceous impurities formed on the surface of the carbon nanotubes.

7. The method of claim 6, wherein the temperature of the sulfidation reaction is 150° C. or more.

8. The method of claim 6, wherein heating the sealed space includes maintaining the sealed space at about 300° C.

9. The method of claim 8, wherein heating the sealed space includes maintaining the sealed space at about 300° C. for more than 30 minutes.

10. The method of claim 8, wherein the sulfiding further includes forming a vacuum state in the sealed space by discharging gas in the sealed space before the heating of the sealed space.

11. The method of claim 6, wherein the device is a carbon nanotube-field effect transistor (CNT-FET).

* * * * *

UNITED STATES PATENT AND TRADEMARK OFFICE
CERTIFICATE OF CORRECTION

PATENT NO. : 7,604,790 B2  Page 1 of 1
APPLICATION NO. : 11/370995
DATED : October 20, 2009
INVENTOR(S) : Eun-Ju Bae et al.

It is certified that error appears in the above-identified patent and that said Letters Patent is hereby corrected as shown below:

Title Page, insert:

Item (30)

Foreign Application Priority Data

Jun. 28, 2005  (KR)..............................10-2005-0056228

Signed and Sealed this

First Day of December, 2009

David J. Kappos
*Director of the United States Patent and Trademark Office*